US United States Patent [19] [11] 3,896,059
Wakefield et al. [45] July 22, 1975

[54] PRODUCTION OF RESINS FROM SOLUBILIZED SCRAP RUBBER, THE RESINS THUS PRODUCED AND RUBBER COMPOUNDS AND PRODUCTS INCORPORATING THE RESINS

[75] Inventors: Lynn B. Wakefield; Grant Crane; Edward Leo Kay, all of Akron, Ohio

[73] Assignee: The Firestone Tire & Rubber Company, Akron, Ohio

[22] Filed: Feb. 5, 1974

[21] Appl. No.: 439,774

[52] U.S. Cl. ............... 260/2.3; 152/357; 260/3; 260/32.8 A; 260/33.6 AQ; 260/93.1; 260/887
[51] Int. Cl.² ............... C08J 11/00; C08C 19/08
[58] Field of Search ............... 260/2.3, 719

[56] References Cited
UNITED STATES PATENTS

| | | | |
|---|---|---|---|
| 2,871,206 | 1/1959 | Mankowich et al. | 260/2.3 |
| 3,563,922 | 2/1971 | Massaubre | 260/2.3 |
| 3,674,433 | 7/1972 | Wyatt | 260/2.3 |
| 3,700,615 | 10/1972 | Scott | 260/2.3 |

*Primary Examiner*—Wilbert J. Briggs, Sr.

[57] ABSTRACT

Useful resins are prepared from scrap rubber by first heating the scrap rubber in the presence of a hydrocarbon liquid to effect solubilization of the rubber, and then contacting the solubilized rubber with an alkylation catalyst to form the resin. Optionally an aldehyde or ketone can be present in the contacting step.

The resins, when incorporated into rubber compounds, enhance the tack and uncured tensile strength of the compounds and act to stabilize the contained elastomers against heat aging.

The compounds which contain the resins can be made into shaped, vulcanized products, such as tires.

8 Claims, No Drawings

PRODUCTION OF RESINS FROM SOLUBILIZED SCRAP RUBBER, THE RESINS THUS PRODUCED AND RUBBER COMPOUNDS AND PRODUCTS INCORPORATING THE RESINS

BACKGROUND OF THE INVENTION

This invention relates to a method of producing a resin from solid scrap vulcanized or unvulcanized rubber. The invention also encompasses the resin thus produced, and its use in rubber.

Tackifying resins have been long used in synthetic rubber compounding to provide sufficient tack to component parts of tires and the like so that the uncured articles will retain their integrity until final vulcanization. Substantial quantities of various resinous materials are mixed into synthetic rubber along with other compounding ingredients to produce an uncured stock which has a tack comparable with that of natural rubber. Commercial tackifying resins have been prepared from coal tar, and, more recently, from petroleum sources. Recent petroleum shortages have prompted a search for other resin sources, to free crude supplies for more urgent and profitable products.

SUMMARY OF THE INVENTION

It has now been found that a useful family of resins can be produced from solid scrap vulcanized or unvulcanized rubber, as follows:

Scrap rubber is first heated in the presence of a hydrocarbon liquid to effect dissolution of the hydrocarbon portion of the scrap rubber.

The solubilized scrap rubber thus obtained is then treated with minor amounts of reagents generally classified as alkylation catalysts to form the resins of the invention. Optionally, aldehydes or ketones of up to 20 carbon atoms (or their precursors) can be present during the treatment. The advantage of incorporating aldehydes or ketones is that the resins thus formed have a reduced tendency to stain, and can thus be used in combination with rubber stocks for white wall tires.

The resins of the invention, when incorporated into rubber compounds at a level of from 1 to 50 parts, preferably 1 to 30 parts by weight per 100 parts of rubber, have several beneficial effects. First, they enhance the tack of the compounds at least as well as commercial resins used for this purpose. Second, they increase the tensile strength of the uncured rubber compounds measurably. Finally, they have an unexpected stabilizing effect on elastomers against degradation, which effect can be shown by heat aging studies. The compounds can then be shaped and cured into finished articles, such as tires.

DETAILED DESCRIPTION OF THE INVENTION

In order to be in usable form, the solid scrap rubber must be treated to render it in fluid form. The method will be described in detail.

In general, the solid scrap rubber to be treated will be in the form of used or scrap tires. Other forms and sources of scrap rubber may be treated, however, and the method is applicable to any vulcanized or unvulcanized rubber article for which recycling is desired. The polymeric content of the articles can be natural rubber or synthetic rubber, or blends of the two. By synthetic rubber is meant, chiefly, homopolymers of butadiene, isoprene, chloroprene, or piperylene, or copolymers of these monomers with each other or such comonomers as styrene, alpha-methylstyrene, divinylbenzene, ethylene, propylene, isobutylene, an ethylenically unsaturated carboxylic acid, ester or nitrile and the like.

The rubber can contain conventional sulfur curing systems, antioxidants, antiozonants, pigments, softeners and other well-known rubber chemicals and compounding ingredients. Usually, the rubber is sufficiently cross-linked, cured, or vulcanized as to be suitable for its original use, so that it will maintain its shape and have a certain degree of resiliency and elasticity. The process of the invention is not primarily intended for use on scrap raw rubber which has not been vulcanized or cross-linked. There is no reason why such scrap could not be treated similarly, but vulcanized or cross-linked rubber scrap is more plentiful, and presents a far more difficult problem. It has also been found that scrap tires which have been rejected because of defects are compatible with the process of the invention, without the need to age them several years as required in conventional rubber reclaiming processes. Thus, newly manufactured scrap tires can also be treated, as well.

If the scrap rubber is in the form of used or scrap tires it will normally contain reinforcing elements of metal or glass or organic fiber. These elements, or some of them, can be removed by a relatively expensive pre-treatment, or they can be left in place during the treatment. Removal of metal bead wires is preferred and is relatively inexpensive, but removal of cord elements is rather difficult and expensive by a pre-treatment, and the cords can usually be left in place. The presence of organic fibers in the rubber does not present a serious problem. Fibers of Nylon 6, Nylon 66, or polyethyleneterephthalate will be easily dispersed or solubilized in the hydrocarbon liquid along with the rubber. In the case of rayon fibers, these materials usually retain their integrity, and, if present, can be removed by screening. Glass or steel cord will similarly be unaffected by the treatment and can be similarly removed, if present.

If desired, the scrap rubber can be treated to reduce its particle size before the treatment. Although there is no theoretical reason why a whole scrap tire cannot be utilized in the process of the invention, certain practical constraints must be considered. Size-reduction can be performed in any convenient manner, and the particle size can be any size which facilitates handling. Commercial machinery is available which is capable of cutting a whole tire into small irregular size fragments, including the beads, which fragments are quite suitable for the process of the invention. If the beads or other steel reinforcing elements are not removed beforehand, they can be screened out of the product or removed by magnetic separation means. A reasonably small particle size piece of scrap rubber is desired from the standpoint of charging the reactor and ease of stirring the mixture. Considerations of cost of size-reduction by mechanical means vs. increased fluidization rates for smaller particles will generally dictate what size-reduction measures will be employed, if any.

The hydrocarbon liquid used can be chosen from a variety of materials and combinations thereof. In general, a hydrocarbon liquid which contains a substantial portion of aromatic constituents is preferred. The aromatic portion of the hydrocarbon can be a low-boiling aromatic hydrocarbon, such as benzene, or it can be a higher boiling aromatic hydrocarbon such as toluene, xylene, naphthalene, anthracene, phenanthrene, etc., or mixtures of two or more of these compounds.

For the hydrocarbon liquid, a rubber processing oil can be used, selected from a number of such products which are commercially available. It has been found that aromatic processing oils are especially effective in the process of the invention. Hydrocarbon oils derived from petroleum or coal tar are recommended. These oils are commonly used in rubber compounding, and are generally described as "naphthenic", "aromatic", or "paraffinic", depending on the type of predominant structure present in the oils. Any or all of these oils are operable in the process of the invention, however, the oils generally described as aromatic, or "highly aromatic" are preferred. A description of some of the preferred oils is found in A.S.T.M. Specification D2226, with specific reference to types 101 and 102 listed therein.

One such oil, found to be particularly effective in the process of the invention is identified by its manufacturer as "Dutrex 726", with the following typical properties specified:

| | |
|---|---|
| Specific gravity at 60°F. | 0.9895 |
| Viscosity, SSU, 212°F. | 83 |
| Flash point, C.O.C., °F. | 425 |
| Volatility, 22 hrs. at 225°F. wt. % | 0.2 |
| Neutralization No., mg. KOH/g. | 0.80 |
| Aniline point, °F. | 105 |

Alternatively, the hydrocarbon liquid can be a standard product of a refinery which is normally used as a fuel, paint-thinner, or the like. Also, the fluidized rubber itself can be used as the hydrocarbon liquid.

The use of from about 10 percent up to about 1000 percent by weight of the hydrocarbon liquid, based on the scrap rubber is recommended. The processing variables, namely, time, temperature, agitation (if used), the nature of the rubber and the composition of the hydrocarbon liquid, will determine the character of the fluid along with the relative proportions of rubber and hydrocarbon liquid. While the precise nature of the change is not known, it is surmised that one effect of the treatment of the rubber is to depolymerize a portion of the rubber to produce lower molecular-weight materials which reduce the viscosity of the soluble reclaim, and dissolve a substantial portion of the rubber. Thus, by incremental additions of more rubber after the first charge has been solubilized, the composition can approach 100% rubber asymptotically.

When a low-boiling aromatic hydrocarbon is employed, it can be distilled off the final mixture, if desired, to leave a fluid composition which is essentially 100% rubber.

Heat treatment at temperatures from 400° to 800°F., preferably 550°–700°F., for 0.1 to 50 hours or more is recommended. Naturally, the effects of time and temperature are interrelated, so that longer times will generally be required for lower temperatures, and vice versa. Temperatures lower than 400°F. are generally not economical, since too long a treatment time would be required. Temperatures above 800°F. may result in some carbonization of the rubber and would also require high operating pressures in the presence of low-boiling hydrocarbons which are generated in the process. Where high concentrations of rubber in the fluid are desired, the treatment will necessarily be more severe, in the higher ranges of both time and temperature.

The heat treatment can be performed at atmospheric pressure, or at higher pressures, up to 20 atmospheres, if desired. Higher pressures will contain any volatiles in the mixture; alternatively, any volatiles which boil off can be condensed and either recovered separately or returned. In general, the treatment should be performed under pressure sufficient to maintain most of the materials in the liquid phase. The pressure can be autogenous, that is, produced by the vapor pressure of the materials at the elevated temperature of the reaction.

Another factor which affects the time and temperature of the process is the particle size of the rubber, which is indicative of its surface area. The larger surface area which accompanies a reduction in particle size will improve contact between the rubber and the hydrocarbon solvent, and thus speed the dissolution process. Better heat-transfer is also realized with smaller particles, hence, the reaction rate is increased. Since size-reduction adds cost to the product, the cost of this operation must be taken into account, offsetting increases in the rate of the dissolution reaction.

Agitation, while not essential to the process of the invention, generally acts to increase the dissolution rate. Both shear and displacement act to facilitate the process, effecting some size-reduction, and improving heat transfer.

In general, the procedure for converting the solid rubber to a fluid state is to charge an autoclave with scrap rubber and a hydrocarbon liquid and to heat the mixture to effect dissolution of the hydrocarbon portion of the scrap rubber. If the scrap rubber charge had been previously treated to remove fabric, the fluid obtained from the autoclave can be used without further treatment. If the scrap rubber charge contained fabric, the fluid as obtained from the autoclave can be screened to remove undissolved glass, steel or rayon fabric. As mentioned above, fabrics of nylon or polyester will generally not remain intact, and are not a problem. Magnetic separation can be employed if steel fragments are to be removed.

The catalysts which are effective in the process of the invention have been broadly described as "alkylation catalysts". Such catalysts can be classified in three categories, namely: Lewis acids, protonic acids and condensation catalysts.

Among the Lewis acids which can be used are a variety of metal halides, such as the fluorides, chlorides or bromides of aluminum, arsenic, antimony, bismuth, boron, cobalt, copper, iron, gallium, lead, mercury, nickel, tin, titanium, and zinc. Preferred is boron trifluoride.

Protonic acids which can be used include $H_2SO_4$, HCl, HF, $HSO_3F$, benzenesulfonic acid, and p-toluenesulfonic acid. Preferred is $H_2SO_4$.

Condensation catalysts include sulfur dichloride, thionyl chloride, chlorosulfonic acid, sulfuryl chloride, phosphorous trichloride, and phosphorous oxychloride. Preferred are $S_2Cl_2$ and $PCl_5$.

When boron trifluoride is used as the catalyst it is preferably used in solution in diethyl ether.

Generally, the catalyst is employed in minor amounts, that is, from about 0.1 to 20% by weight, based on the fluidized scrap rubber.

Contact of the solubilized rubber with the catalyst is performed at a temperature of from about 60°F. to about 300°F., for from 0.5 to 50 hours. Normally, the contact is performed in a sealed space so as to contain volatiles under autogenous pressure. Atmospheric pressure can be employed, however, with reflux condensation of the volatiles.

When a less-staining resin is desired, the use of an aldehyde or ketone co-reactant is preferred. From 2 to 40 percent by weight of an aliphatic aldehyde or ketone containing up to 20 carbon atoms should be present during the contact of the solubilized rubber with the catalyst. Low molecular weight aldehydes and ketones are preferred, with formaldehyde especially preferred. If desired, precursors of the aldehydes or ketones can be used as equivalents, such as, for example, paraformaldehyde.

For convenience, and improved reaction rates and better temperature, a diluent can be present during the step of producing the resin from the solubilized scrap rubber. An aromatic hydrocarbon solvent is preferred, such as toluene, xylene, and the like. Amounts from 25 to 75% by weight of solvent based on the solubilized scrap rubber can be used to advantage. If the initial heating step is performed in the presence of a substantial amount of an aromatic hydrocarbon solvent, the solvent can be allowed to remain instead of being distilled off.

The resins of the invention are used in rubber compounds of all types wherein improved tack, uncured tensile strength and stability are desired. From 1 to 50 parts by weight of the resin, preferably from 1 to 30 parts, per 100 parts of rubber can be used to advantage. The compounds containing the resins can be made into any of a variety of finished articles, such as tires, belts, small molded parts, and the like, forming a part or all of the finished article.

A better understanding of the invention can be obtained by reference to the following specific examples, in which all proportions are by weight unless otherwise indicated. The examples are presented for illustrative purposes only, and are not to be construed as limiting the scope of the invention.

EXAMPLE I

In order to obtain a quantity of solubilized scrap rubber, a rejected scrap tire was first cut into pieces approximately 2.5 cm. × 5 cm. × 0.6 cm. The pieces, together with an equal weight of toluene, were charged to an autoclave, and the mixture was heated at about 500°F. for approximately 24 hours. The product, a fluid, was cooled to about 120°F. and strained through a fine mesh screen to remove any undissolved fabric, glass or steel. The fluid was then heated to remove the toluene at atmospheric pressure. The fluid was then ready for further treatment.

EXAMPLE II

In a manner similar to Example I, scrap tire pieces were charged to an autoclave, except that an equal weight of an aromatic processing oil (Dutrex 726) was substituted for the toluene. The mixture was heat-treated at nominally 550°F. for 24 hours. Additional charges of scrap tire pieces were then incrementally added until the calculated concentration of the mixture was 90% scrap rubber and 10% oil. After cooling to 120°F. a quantity of hexane was added to reduce the viscosity of the mixture, and the mixture was screened as before. The hexane was then distilled off.

EXAMPLE III

The products of Examples I and II were then diluted with equal weights of toluene, and portions thereof were treated with a variety of alkylation catalysts. In each run 5 parts by weight of catalyst was added to 100 parts of the products of Examples I and II, and the materials were agitated in a vessel at about 175°F. for approximately 15 hours. In half of the runs 20 parts by weight of paraformaldehyde was also present. In each run the product was then discharged into aqueous sodium carbonate to neutralize any residual acid present. The aqueous phase was drawn off, and the toluene was removed by distillation.

Essentially quantitative yields were produced in each run of solid, friable resin product, as summarized in Table I below:

TABLE I

| Sample No. | Fluidized Rubber | Paraformaldehyde | Catalyst |
|---|---|---|---|
| 1 | Example I | — | $S_2Cl_2$ |
| 2 | Example I | 20 pts. | $S_2Cl_2$ |
| 3 | Example I | — | $PCl_5$ |
| 4 | Example I | 20 pts. | $PCl_5$ |
| 5 | Example I | — | $BF_3$ |
| 6 | Example I | 20 pts. | $BF_3$ |
| 7 | Example I | — | $H_2SO_4$ |
| 8 | Example I | 20 pts. | $H_2SO_4$ |
| 9 | Example II | — | $S_2Cl_2$ |
| 10 | Example II | 20 pts. | $S_2Cl_2$ |
| 11 | Example II | — | $PCl_5$ |
| 12 | Example II | 20 pts. | $PCl_5$ |
| 13 | Example II | — | $BF_3$ |
| 14 | Example II | 20 pts. | $BF_3$ |
| 15 | Example II | — | $H_2SO_4$ |
| 16 | Example II | 20 pts. | $H_2SO_4$ |

EXAMPLE IV

The resin products of Example III were then evaluated in experimental rubber compounds and tested before and after vulcanization. The following formulation was used:

| Material | Parts by Weight |
|---|---|
| Emulsion styrene/butadiene copolymer | 65 |
| Natural rubber | 35 |
| Carbon black | 75 |
| Processing oil | 10 |
| Sulfur | 2 |
| Antioxidant | 1.8 |
| Zinc oxide | 4 |
| Resin (as indicated) | 17 |

As a control, a commercial tackifying resin, Piccopale 100, was included in the evaluations.

The resins prepared from the fluidized scrap rubber of Example I were also substituted in the above formulation and the compounds were tested for tack and uncured tensile strength. The results are set forth in Table II, following.

TABLE II

| Test No. | Resin | Tack, lb./in | Uncured tensile strength, lb. | | | % Elongation |
|---|---|---|---|---|---|---|
| | | | Initial | Peak | Break | |
| 1 | Piccopale 100 | 19 | 55 | 60 | 50 | 988 |
| 2 | Sample No. 1 | 27 | 70 | 120 | 115 | 1045 |
| 3 | Sample No. 2 | 26 | 70 | 97 | 95 | 1235 |
| 4 | Sample No. 3 | 31 | 65 | 95 | 95 | 1195 |
| 5 | Sample No. 4 | 24.5 | 60 | 60 | 40 | 950 |
| 6 | Piccopale 100 | 19 | 47.5 | 47.5 | — | 1250 |
| 7 | Sample No. 5 | 17 | 55 | 55 | — | 1250 |
| 8 | Sample No. 6 | 21 | 55 | 55 | 55 | 1108 |
| 9 | Sample No. 7 | 30 | 65 | 135 | 135 | 1150 |
| 10 | Sample No. 8 | 31 | 60 | 110 | 110 | 1205 |

From the results in Table II it can be seen that the resins of the invention generally impart a greater tack and tensile strength to the uncured test compound than the standard Piccopale 100 resin. Both properties are important in the operations of assembling and handling uncured rubber products, such as, for example, tires. In general, the resins of the invention which were prepared with paraformaldehyde (Samples 2, 4, 6 and 8) exhibit lower tensile strength values than the similar resins prepared without paraformaldehyde (Samples 1, 3, 5 and 7, respectively). Tack values are apparently not affected by the presence of paraformaldehyde during the resin-forming step.

EXAMPLE V

In order to evaluate the staining nature of the compounds of the previous example, a series of strips was prepared. A strip from each compound was cured in contact with a standard whitewall stock. The cured strips were then exposed to ultra violet radiation and examined at 4, 16 and 24 hours. The extent to which each strip stained the whitewall stock was visually compared. The results are summarized in Table III following.

TABLE III

| Test No. | 4 hrs. | 16 hrs. | 24 hrs. |
|---|---|---|---|
| 1 | VVSl. | VSl.-Sl. | Sl. |
| 2 | Sl.-M | M-Sev. | Sev. |
| 3 | Sl. | M | M-Sev. |
| 4 | VVSl. | Sl.-M | M |
| 5 | VVSl. | Sl. | Sl.-M |
| 6 | VVSl. | VSl. | Sl. |
| 7 | VVSl. | Sl. | M |
| 8 | VVSl | VSl. | VSl. |
| 9 | VSl.-Sl. | Sl. | M |
| 10 | VVSl. | VSl. | Sl. |

VVSl. = Very, very slight stain
VSl. = Very slight stain
SL. = Slight stain
M = Medium Stain
Sev. = Severe stain A comparison of the data in Table III shows that several of the resins of the invention stained to the same degree as the control, and test No. 8 appeared to show results superior to the control.

EXAMPLE VI

To evaluate the effectiveness of the resins of the invention as stabilizers, the resins listed in Table I were compared with a commercial stabilizer, and with a stabilizer-free elastomer. The elastomer used was a styrene-butadiene copolymer produced in solution using a lithium-based initiator. The commercial stabilizer was N-(1,3-dimethylbutyl)-N'-phenyl-p-phenylenediamine, identified by its manufacturer as "Santoflex 13", and was used at the level of 0.5 parts by weight per 100 parts of elastomer. Each of the resins of the invention was used at the level of 10 parts by weight per 100 parts of elastomer. This higher level was chosen as within the typical level of use for tackifying resins.

The Mooney viscosity (ML$_4$, 212°F.) was measured on each run at the start of the test, and after 4 hrs. and 8 hrs. in a circulating hot air oven at 167°F. (75°C.). The results are shown in Table IV, following.

TABLE IV

| Run No. | Stabilizer | Mooney Viscosity ML$_4$, 212°F. | | |
|---|---|---|---|---|
| | | Original | 4 hrs. | 8 hrs. |
| 1 | None | 91 | 167 | 177 |
| 2 | Santoflex 13 | 88.5 | 88 | 87 |
| 3 | Sample 1 | 85 | 83 | 83 |
| 4 | Sample 2 | 88.5 | 87 | 87 |
| 5 | Sample 3 | 85 | 97 | 108 |
| 6 | Sample 4 | 85.5 | 93.5 | 104 |
| 7 | Sample 5 | 85 | 84.5 | 84 |
| 8 | Sample 6 | 89 | 86.5 | 87 |
| 9 | Sample 7 | 85 | 86.5 | 86.5 |
| 10 | Sample 8 | 85 | 83 | 82 |
| 11 | Sample 9 | 79 | 83 | 84 |
| 11 | Sample 9 | 79 | 83 | 84 |
| 12 | Sample 10 | 80.5 | 80 | 80 |
| 13 | Sample 11 | 82 | 85 | 85 |
| 14 | Sample 12 | 84 | 83 | 83 |
| 15 | Sample 13 | 79 | 79 | 79 |
| 16 | Sample 14 | 83 | 76.5 | 71.5 |
| 17 | Sample 15 | 78.5 | 79 | 79 |
| 18 | Sample 16 | 72 | 66.5 | 61 |

The data in Table IV show that, without a stabilizer, the effect of heat aging is to increase the Mooney viscosity of the elastomer drastically. With the resins present, all runs showed an improvement over the unprotected run, and many of the resin runs were essentially equivalent to the run wherein Santoflex 13 was present.

We claim:

1. The method of producing a resin by the successive steps of
    heating solid scrap rubber in contact with a hydrocarbon liquid at 400° to 800°F. for 0.1 to 50 hours to convert the solid scrap rubber to a fluid,
    and contacting the fluid thus produced with an alkylation catalyst which is a Lewis acid, a protonic acid or a condensation catalyst in an amount which is from 0.1 to 20% by weight, based on the fluid, at a temperature of from 60°F. to 300°F. for from 0.5 to 50 hours, wherein said solid scrap rubber is natural or synthetic rubber or blends of the two, and said synthetic rubber is a homopolymer of butadiene, isoprene, chloroprene or piperylene, or a copolymer of them with each other or with styrene, alpha-methylstyrene, divinylbenzene, ethylene, propylene, isobutylene, or an ethylenically unsaturated carboxylic acid ester or nitrile.

2. The method of claim 1, wherein from 2 to 40 percent by weight of an aliphatic aldehyde or ketone having up to 20 carbon atoms is present in the fluid before it is placed in contact with the catalyst.

3. The product of the method of claim 1.
4. The product of the method of claim 2.
5. A rubber compound containing from 1 to 50 parts by weight per hundred parts of rubber of the product of claim 3.
6. A rubber compound containing from 1 to 50 parts by weight per hundred parts of rubber of the product of claim 4.
7. A tire, a portion of which is made from the compound of claim 5.
8. A tire, a portion of which is made from the compound of claim 6.

* * * * *